July 21, 1925.
R. A. WAKEFIELD
SELF PROPELLED VEHICLE
Filed March 3, 1924
1,546,765
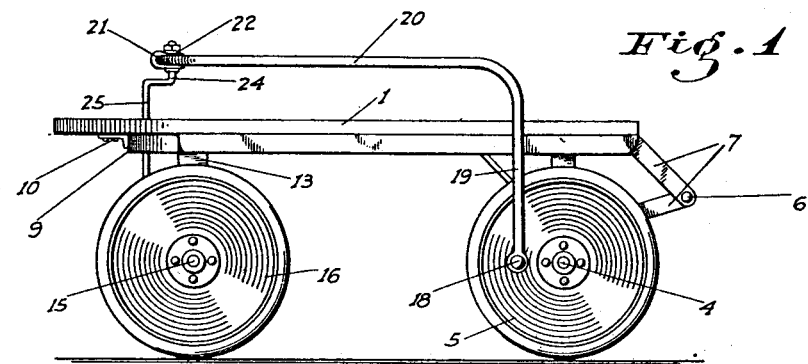
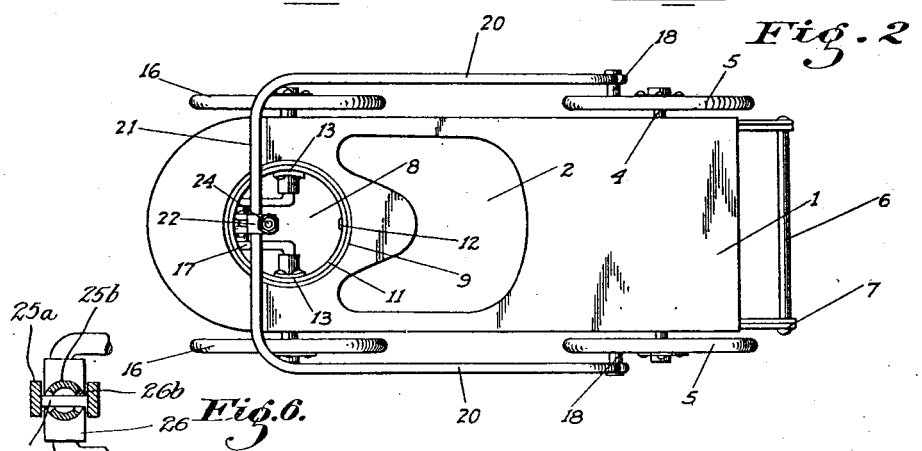
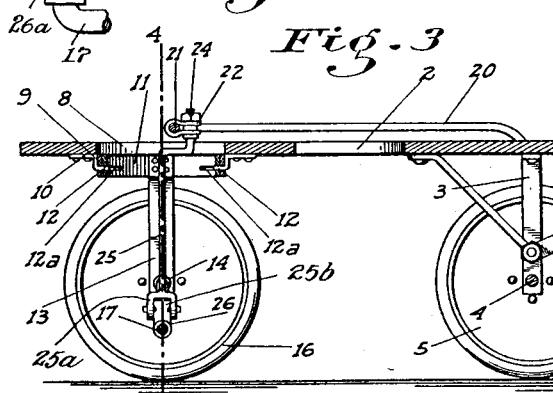
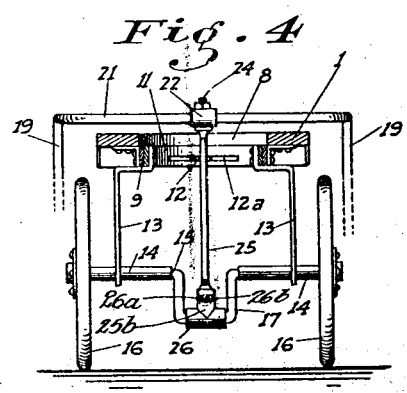
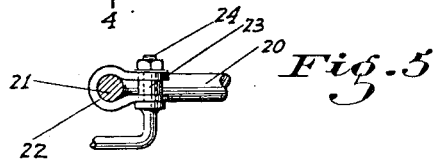
INVENTOR.
R. A. Wakefield
BY
ATTORNEY Patented July 21, 1925.

1,546,765

UNITED STATES PATENT OFFICE.

RALPH A. WAKEFIELD, OF SACRAMENTO, CALIFORNIA.

SELF-PROPELLED VEHICLE.

Application filed March 3, 1924. Serial No. 696,559.

*To all whom it may concern:*

Be it known that I, RALPH A. WAKEFIELD, a citizen of the United States, residing at Sacramento, county of Sacramento, State of California, have invented certain new and useful Improvements in Self-Propelled Vehicles; and I do declare the following to be a full, clear, and exact description of the same, reference being had to the accompanying drawings, and to the characters of reference marked thereon, which form a part of this application.

This invention relates to improvements in self-propelled velocipedes or the like for the use of children, and particularly represents an improvement over the type of device shown in my Patent No. 1,336,935, granted me April 13th, 1920.

My main object now is to provide a vehicle whose wheels are propelled in the same manner as shown in said patent, that is, by means of hand-worked side-arms, but which is provided with a different and improved means for enabling the vehicle to be steered. Stated more specifically, while all four wheels are driven, the front wheels are turnably mounted as a unit for steering purposes, the steering being accomplished by the feet of the operator who exerts pressure with the feet on the front wheel axle on one side or the other of the axis of turning of the front wheel unit. At the same time the driving of said front wheels is not interfered with.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved vehicle.

Fig. 2 is a top plan view of the same.

Fig. 3 is a longitudinal section.

Fig. 4 is a cross section on the line 4—4 of Fig. 3.

Fig. 5 is a detail section of a combined clamp and rod bearing member.

Fig. 6 is a fragmentary detail showing the driving connection to the front-wheel axles.

Referring now more particularly to the characters of reference on the drawings, the numeral 1 denotes a platform of suitable size, also serving as a seat for the rider, and provided with an orifice 2 through which the legs of the operator may project.

Straps 3 depend from the platform or body 1 toward the rear end thereof, and serve as bearings for the straight axle 4 of the rear wheels 5, mounted on said axle outside the straps. A foot-bar 6 preferably extends transversely of the body to the rear of and below the same, being connected thereto by suitable brace and connecting members 7.

Mounted just under the platform 1 concentric with an orifice 8 therein a certain distance ahead of the opening 2 is a circular band 9 held in place by straps or brackets 10. Turnable in the band 9 is another similar band, 11 held in place therein by horizontal opposed lugs 12 projecting through peripheral slots 12$^a$ of certain length in the band 11, said lugs being preferably formed as integral extensions of certain of the straps 10.

Vertical and rigid straps or legs 13 depend from the band 11 in transversely alined relation, on the lower ends of which are fixed spaced sleeves 14, in which is turnable an axle 15, on the outer ends of which are fixed the front wheels 16. Said axle is provided with a centrally disposed crank portion 17 between the sleeves.

Fixed on the rear wheels 5 in offset relation to the axle 4 are crank-pins 18, whose distance from said axle is the same as the offset of the crank 17 from its axle.

Turnable on the pins 18 are the lower ends of vertical arms 19, formed integral with horizontal operating portions 20, which extend forwardly from said arms 19 in parallel relation to each other and to the sides of the platform 1, and are located a certain distance outwardly of the side edges thereof.

The forward ends of the members 20 are connected to each other by an integral transverse bar 21, located above the orifice 8.

Fixed on the bar 21 in longitudinal alinement with the axis of the turnable band 11 is a horizontal bearing member 22, having mounted therein to the rear of the bar, a short length of pipe 23 vertically disposed, said pipe or sleeve serving as the bearing for the turnable offset upper end 24 of a vertical connecting rod 25 which extends down to a fork 25ª which straddles a vertical boss 25ᵇ on a sleeve 26 which is turnably mounted on the crank 17. The fork has a pin 26ª extending longitudinally of the vehicle through radial slots 26ᵇ in the boss 25ª. The crank occupies the same position relative to its axle as do the pins 18 relative to their axle.

To drive the vehicle, the operator seats himself on the platform 1, with his legs projecting through the opening 2 and with his feet resting on the sleeves 14 at an angle to a vertical plane. Upon grasping the side bars 20 with the hands and imparting a combined longitudinal and vertical reciprocatory movement thereto, the wheels will be caused to be rotated, as will be evident.

To steer the vehicle, pressure is exerted by one foot or the other on the corresponding sleeve 14, causing the front wheels to be turned as a unit in a horizontal plane. At the same time, the driving of the front wheels is not interfered with, owing to the pivotal and flexible connection of the rod 25 with the sleeve 26, which permits a certain amount of horizontal turning of the axle 15 relative to the rod 25 being had.

Further movement of this nature between the axle and rod is permitted by reason of the turnable mounting of the upper portion 23 of said rod in the bearing 24.

By holding back on the side bars 20 when the vehicle is travelling forward, a braking action on the wheels is of course had, and the vehicle may thus be brought to a gradual or quick stop whenever desired.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A self propelled vehicle comprising a supporting member, front and rear wheels mounted thereon, one pair of such wheels being arranged to turn in a horizontal plane as a unit, horizontal bars arranged at the sides of the supporting member and adapted to be reciprocated by hand, and connecting means between said bars and the wheels whereby upon the reciprocation of the bars all the wheels will be driven without interfering with the steering of the wheels.

2. A self-propelled vehicle comprising a body member, rear wheels mounted thereon, a front axle having a central crank, wheels fixed on said axle, a turntable structure mounted on said axle centrally of its length, means turnably supporting said turntable from the body, horizontal bars along the sides of the body and connected to each other above and across the plane of the turntable, crank pins on the rear wheels, members depending from said arms and connected to the pins, and a rod flexibly connected to the front-axle crank and turnably connected to the bar-connecting member thereabove.

3. A self-propelled vehicle comprising a body member, rear wheels mounted thereon, a front axle having a central crank, wheels fixed on said axle, horizontal bars along the sides of the body connected to each other above the front wheels, crank pins on the rear wheels, connecting means between said bars and the crank and crank pins, and mounting means for the front axle to enable the same to be turned in a horizontal plane.

4. A self propelled vehicle comprising a body member, rear wheels mounted thereon, a front axle, wheels mounted thereon, vertical and transversely spaced straps through which the axle passes, a circular band to which the upper end of the straps are fixed, means on the body turnably supporting the band, and driving means applied to the axle centrally between said straps.

5. A self propelled vehicle comprising a body member, rear wheels mounted thereon, a front axle having a central crank, wheels fixed on said axle, bearing means for the axle on each side of the crank, a horizontal turntable member supported from the body and to which the bearing means are connected, and hand actuated driving means connected to the crank.

6. A self propelled vehicle comprising a body member, rear wheels mounted thereon, a front axle having a central crank, wheels fixed on said axle, bearing means for the axle on each side of the crank, a horizontal turntable member supported from the body and to which the bearing means are connected, driving means connected to the crank, driving means applied to the rear wheels, and a common hand actuated means connected to both driving means.

In testimony whereof I affix my signature.

RALPH A. WAKEFIELD.